United States Patent
Won (10) Patent No.: US 9,509,949 B2
(45) Date of Patent: Nov. 29, 2016

(54) ELECTRONIC DEVICE AND METHOD OF CONTROLLING THE SAME

(75) Inventor: Jongpil Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 14/386,087

(22) PCT Filed: Apr. 3, 2012

(86) PCT No.: PCT/KR2012/002495
§ 371 (c)(1),
(2), (4) Date: Sep. 18, 2014

(87) PCT Pub. No.: WO2013/151193
PCT Pub. Date: Oct. 10, 2013

(65) Prior Publication Data
US 2015/0042747 A1    Feb. 12, 2015

(51) Int. Cl.
*H04N 7/15* (2006.01)
*H04N 7/14* (2006.01)
*H04L 12/18* (2006.01)
*G08B 5/36* (2006.01)
*H04M 3/56* (2006.01)

(52) U.S. Cl.
CPC ........ *H04N 7/15* (2013.01); *G08B 5/36* (2013.01); *H04L 12/1827* (2013.01); *H04N 7/147* (2013.01); *H04M 3/567* (2013.01)

(58) Field of Classification Search
CPC .......... H04N 7/15; H04N 7/147; H04N 7/14; H04L 12/1827; H04M 3/567; G08B 5/36
USPC ........................................... 348/14.01–14.16
See application file for complete search history.

(56) References Cited

U.S. PATENT DOCUMENTS

| | | | |
|---|---|---|---|
| 8,243,902 B2 * | 8/2012 | Caspi | H04M 3/385 379/142.05 |
| 2003/0174826 A1 | 9/2003 | Hesse | |
| 2007/0188599 A1 * | 8/2007 | Kenoyer | 348/14.08 |
| 2007/0279484 A1 | 12/2007 | Derocher et al. | |
| 2009/0323916 A1 * | 12/2009 | O'Sullivan et al. | 379/202.01 |
| 2010/0171807 A1 | 7/2010 | Tysso | |
| 2012/0206561 A1 * | 8/2012 | Huang | H04L 65/403 348/14.09 |
| 2013/0162752 A1 * | 6/2013 | Herz | H04N 7/15 348/14.08 |

OTHER PUBLICATIONS

PCT International Application No. PCT/KR2012/002495, Written Opinion of the International Searching Authority dated Dec. 6, 2012, 1 page.

* cited by examiner

*Primary Examiner* — Melur Ramakrishnaiah
(74) *Attorney, Agent, or Firm* — Lee, Hong, Degerman, Kang & Waimey (57) ABSTRACT

An electronic device and a method of controlling the electronic device are provided. The electronic device includes a communication unit configured to receive image data and a controller configured to obtain identification information of a participant from the received image data, to obtain personal information of a plurality of candidates, to identify an attendee among the candidates based on the identification information of the participant and the personal information of the candidates, to sort non-attendees other than the attendee among the candidates based on a predetermined time, and to transmit an alarm to other electronic devices corresponding to the non-attendees.

14 Claims, 8 Drawing Sheets

ELECTRONIC DEVICE AND METHOD OF CONTROLLING THE SAME

CROSS-REFERENCE TO RELATED APPLICATIONS

This application is the National Stage filing under 35 U.S.C. 371 of International Application No. PCT/KR2012/002495, filed on Apr. 3, 2012, the contents of which are all hereby incorporated by reference herein in its entirety.

TECHNICAL FIELD

Embodiments of the present invention are directed to an electronic device and a method of controlling the electronic device, and more specifically to an electronic device that may be used for a remote video conference and a method of controlling the electronic device.

BACKGROUND ART

Tele-presence refers to a set of technologies which allow a person to feel as if they were present. Tele-presence technologies reproduce information on five senses a person feels in a specific space at a remote location. Element technologies for tele-presence may include video, audio, tactile, and network transmission technologies. Such tele-presence technologies are adopted for video conference systems. Tele-presence-based video conference systems provide higher-quality communications and allow users to further concentrate on the conversation compared to conventional video conference systems.

The tele-presence technologies for video conference systems, although showing a little difference for each and every manufacturer, may be applicable to video, audio, and network transmission technologies as follows:

For video technologies, the tele-presence technologies apply as generating natural eye-contact images for being able to make a user further feel like he would face another user and generating high-resolution images. For audio technologies, the tele-presence technologies apply as audio playback technologies that may create a feeling of a space based on a speaker's location. For network transmission technologies, the tele-presence technologies apply as real-time image/sound transmission technologies based on an MCU (Multi Control Unit).

Despite the continuing research on the video, audio, or network transmission areas for video conferences, no method is known that can identify whether any attendees sufficient to proceed with a conference are present in a remote site, thus causing inconvenience, such as conducting such identification through other channels or connecting to a video conference system, or having a waiting time.

DISCLOSURE OF INVENTION

Technical Problem

Embodiments of the present invention provide an electronic device that can identify whether there are attendees enough to proceed with a video conference or identify the attendees, and a method of controlling the electronic device.

Solution to Problem

According to an embodiment of the present invention, there is provided an electronic device including a communication unit configured to receive image data and a controller configured to obtain identification information of a participant from the received image data, to obtain personal information of a plurality of candidates, to identify an attendee among the candidates based on the identification information of the participant and the personal information of the candidates, to sort non-attendees other than the attendee among the candidates based on a predetermined time, and to transmit an alarm to other electronic devices corresponding to the non-attendees.

The personal information includes at least one of names, images, departments, and contact information of the candidates, and wherein the controller is configured to transmit the alarm based on the contact information corresponding to the non-attendees.

The identification information of the participant is obtained based on a virtual object image extracted from a specific region included in the image data, and wherein the controller is configured to determine whether the virtual object image corresponds to an image included in the personal information of the candidates and to identify the attendee from the candidates.

The identification information of the participant is obtained based on a specific identifier corresponding to the participant included in the image data, and wherein the controller is configured to determine whether the obtained identification information of the participant corresponds to the personal information of the candidates and to identify the attendee from the candidates.

Whether the specific identifier corresponds to the participant is determined based on a positional relationship between the participant and the specific identifier.

The alarm includes information on at least one of the candidates, a conference time, a conference site, and a conference topic.

The electronic device further includes a display unit configured to display the identified attendee among the candidates.

According to an embodiment of the present invention, there is provided a method of controlling an electronic device, the method including receiving image data, obtaining identification information of a participant from the received image data, obtaining personal information of a plurality of candidates, identifying an attendee among the candidates based on personal information of the candidates and the identification information of the participant, sorting non-attendees other than the attendee among the candidates based on a predetermined time, and transmitting an alarm to other electronic devices corresponding to the non-attendees.

The personal information includes at least one of names, images, departments, and contact information of the candidates, and wherein the alarm is transmitted based on the contact information corresponding to the non-attendees.

The identification information of the participant is obtained based on a virtual object image extracted from a specific region included in the image data, and the method further comprises determining whether the virtual object image corresponds to an image included in the personal information of the candidates and identifying the attendee from the candidates.

The identification information of the participant is obtained based on a specific identifier corresponding to the participant included in the image data, and wherein the method further comprises determining whether the obtained identification information of the participant corresponds to the personal information of the candidates and identifying the attendee from the candidates.

Whether the specific identifier corresponds to the participant is determined based on a positional relationship between the participant and the specific identifier.

The alarm includes information on at least one of the candidates, a conference time, a conference site, and a conference topic.

The method further includes displaying the identified attendee among the candidates.

Advantageous Effects of Invention

According to the embodiments of the present invention, it can be possible to receive in real time the attendees' information to identify whether there are any attendees to be able to perform a remote video conference between remote sites.

Further, an alarm may be transmitted to the non-attendees other than the attendees among the conference attending candidates based on a predetermined time so that a remote video conference can be done smoothly even without having any waiting time or connecting to the video conference system to identify whether there are any attendees.

BEST MODE FOR CARRYING OUT THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

Figure 1:
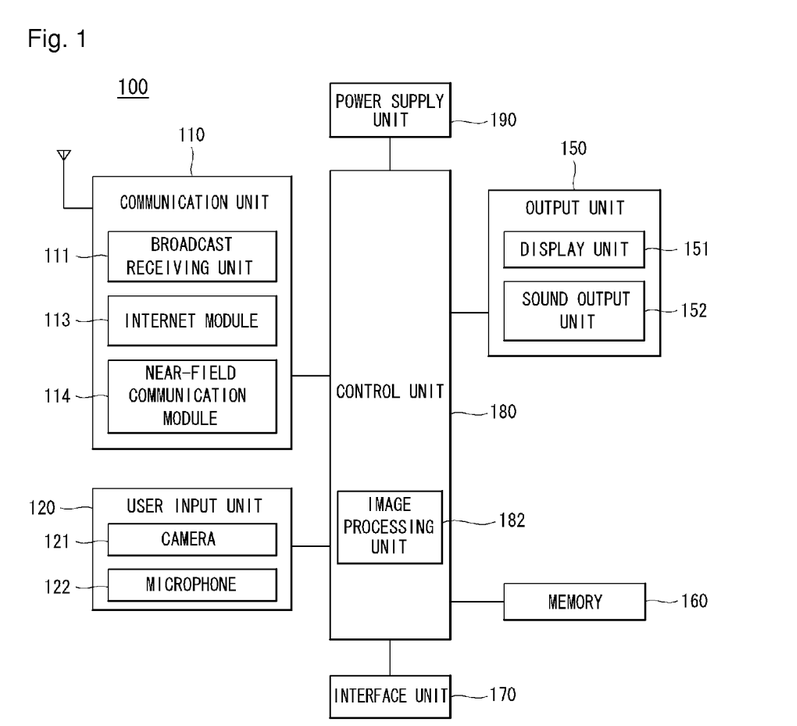
FIG. 1 is a block diagram illustrating an electronic device according to an embodiment of the present invention.

FIG. 1 is a block diagram illustrating an electronic device according to an embodiment of the present invention.

Referring to FIG. 1, the electronic device 100 includes a communication unit 110, a user input unit 120, an output unit 150, a memory 160, an interface unit 170, a control unit 180, and a power supply unit 190. The components shown in FIG. 1 may be components that may be commonly included in an electronic device. Accordingly, more or less components may be included in the electronic device 100.

The communication unit 110 may include one or more modules that enable communication between the electronic device 100 and a communication system or between the electronic device 100 and another device. For instance, the communication unit 110 may include a broadcast receiving unit 111, an Internet module 113, and a near-field communication module 114.

The broadcast receiving unit 111 receives broadcast signals and/or broadcast-related information from an external broadcast managing server through a broadcast channel.

The broadcast channel may include a satellite channel and a terrestrial channel. The broadcast managing server may refer to a server that generates broadcast signals and/or broadcast-related information and broadcasts the signals and/or information or a server that receives pre-generated broadcast signals and/or broadcast-related information and broadcasts the signals and/or information to a terminal. The broadcast signals may include TV broadcast signals, radio broadcast signals, data broadcast signals as well as combinations of TV broadcast signals or radio broadcast signals and data broadcast signals.

The broadcast-related information may refer to information relating to broadcast channels, broadcast programs, or broadcast service providers. The broadcast-related information may be provided through a communication network.

The broadcast-related information may exist in various forms, such as, for example, EPGs (Electronic Program Guides) of DMB (Digital Multimedia Broadcasting) or ESGs (Electronic Service Guides) of DVB-H (Digital Video Broadcast-Handheld).

The broadcast receiving unit 111 may receive broadcast signals using various broadcast systems. Broadcast signals and/or broadcast-related information received through the broadcast receiving unit 111 may be stored in the memory 160.

The Internet module 113 may refer to a module for access to the Internet. The Internet module 113 may be provided inside or outside the electronic device 100.

The near-field communication module 114 refers to a module for near-field communication. Near-field communication technologies may include Bluetooth, RFID (Radio Frequency Identification), IrDA (Infrared Data Association), UWB (Ultra Wideband), and ZigBee technologies.

The user input unit 120 is provided for a user's entry of audio or video signals and may include a camera 121 and a microphone 122.

The camera 121 processes image frames including still images or videos as obtained by an image sensor in a video call mode or image capturing mode. The processed image frames may be displayed by the display unit 151. The camera 121 may perform 2D or 3D image capturing or may be configured as one or a combination of 2D and 3D cameras.

The image frames processed by the camera 121 may be stored in the memory 160 or may be transmitted to an outside device through the communication unit 110. According to an embodiment, two or more cameras 121 may be included in the electronic device 100.

The microphone 122 receives external sound signals in a call mode, recording mode, or voice recognition mode and processes the received signals as electrical voice data. The microphone 122 may perform various noise cancelling algorithms to remove noises created when receiving the external sound signals. A user may input various voice commands through the microphone 122 to the electronic device 100 to drive the electronic device 100 and to perform functions of the electronic device 100.

The output unit 150 may include a display unit 151 and a sound output unit 152.

The display unit 151 displays information processed by the electronic device 100. For example, the display unit 151 displays a UI (User Interface) or GUI (Graphic User Interface) associated with the electronic device 100. The display unit 151 may be at least one of a liquid crystal display, a thin film transistor liquid crystal display, an organic light emitting diode display, a flexible display, and a 3D display. The display unit 151 may be configured in a transparent or light transmissive type, which may be called a "transparent display" examples of which include transparent LCDs. The display unit 151 may have a light-transmissive rear structure in which a user may view an object positioned behind the terminal body through an area occupied by the display unit 151 in the terminal body.

According to an embodiment, two or more display units 151 may be included in the electronic device 100. For instance, the electronic device 100 may include a plurality of display units 151 that are integrally or separately arranged on a surface of the electronic device 100 or on respective different surfaces of the electronic device 100.

When the display unit 151 and a sensor sensing a touch (hereinafter, referred to as a "touch sensor") are layered (this layered structure is hereinafter referred to as a "touch sensor"), the display unit 151 may be used as an input device as well as an output device. The touch sensor may include, for example, a touch film, a touch sheet, or a touch pad.

The touch sensor may be configured to convert a change in pressure or capacitance, which occurs at a certain area of the display unit 151, into an electrical input signal. The touch sensor may be configured to detect the pressure exerted during a touch as well as the position or area of the touch.

Upon touch on the touch sensor, a corresponding signal is transferred to a touch controller. The touch controller processes the signal to generate corresponding data and transmits the data to the control unit 180. By doing so, the control unit 180 may recognize the area of the display unit 151 where the touch occurred.

The sound output unit 152 may output audio data received from the communication unit 110 or stored in the memory 160. The sound output unit 152 may output sound signals associated with functions (e.g., call signal receipt sound, message receipt sound, etc.) performed by the electronic device 100. The sound output unit 152 may include a receiver, a speaker, and a buzzer.

The memory 160 may store a program for operation of the control unit 180, and may preliminarily store input/output data (for instance, phone books, messages, still images, videos, etc.). The memory 160 may store data relating to vibrations and sounds having various patterns, which are output when the touch screen is touched.

The memory 160 may include at least one storage medium of flash memory types, hard disk types, multimedia card micro types, card type memories (e.g., SD or XD memories), RAMs (Random Access Memories), SRAM (Static Random Access Memories), ROMs (Read-Only Memories), EEPROMs (Electrically Erasable Programmable Read-Only Memories), PROM (Programmable Read-Only Memories), magnetic memories, magnetic discs, and optical discs. The electronic device 100 may operate in association with a web storage performing a storage function of the memory 160 over the Internet.

The interface unit 170 functions as a path between the electronic device 100 and any external device connected to the electronic device 100. The interface unit 170 receives data or power from an external device and transfers the data or power to each component of the electronic device 100 or enables data to be transferred from the electronic device 100 to the external device. For instance, the interface unit 170 may include a wired/wireless headset port, an external recharger port, a wired/wireless data port, a memory card port, a port connecting a device having an identification module, an audio I/O (Input/Output) port, a video I/O port, and an earphone port.

The control unit 180 controls the overall operation of the electronic device 100. For example, the control unit 180 performs control and processes associated with voice call, data communication, and video call. The control unit 180 may include an image processing unit 182 for image process. The image processing unit 182 is described below in relevant parts in greater detail.

The power supply unit 190 receives internal or external power under control of the control unit 180 and supplies the power to each component for operation of the component.

The embodiments described herein may be implemented in software or hardware or in a combination thereof, or in a recording medium readable by a computer or a similar device to the computer. When implemented in hardware, the embodiments may use at least one of ASICs (application specific integrated circuits), DSPs (digital signal processors), DSPDs (digital signal processing devices), PLDs (programmable logic devices), FPGAs (field programmable gate arrays, processors, controllers, microcontrollers, microprocessors, and electrical units for performing functions. According to an embodiment, the embodiments may be implemented by the control unit 180.

When implemented in software, some embodiments, such as procedures or functions, may entail a separate software module for enabling at least one function or operation. Software codes may be implemented by a software application written in proper programming language. The software codes may be stored in the memory 160 and may be executed by the control unit 180.

Figure 2:
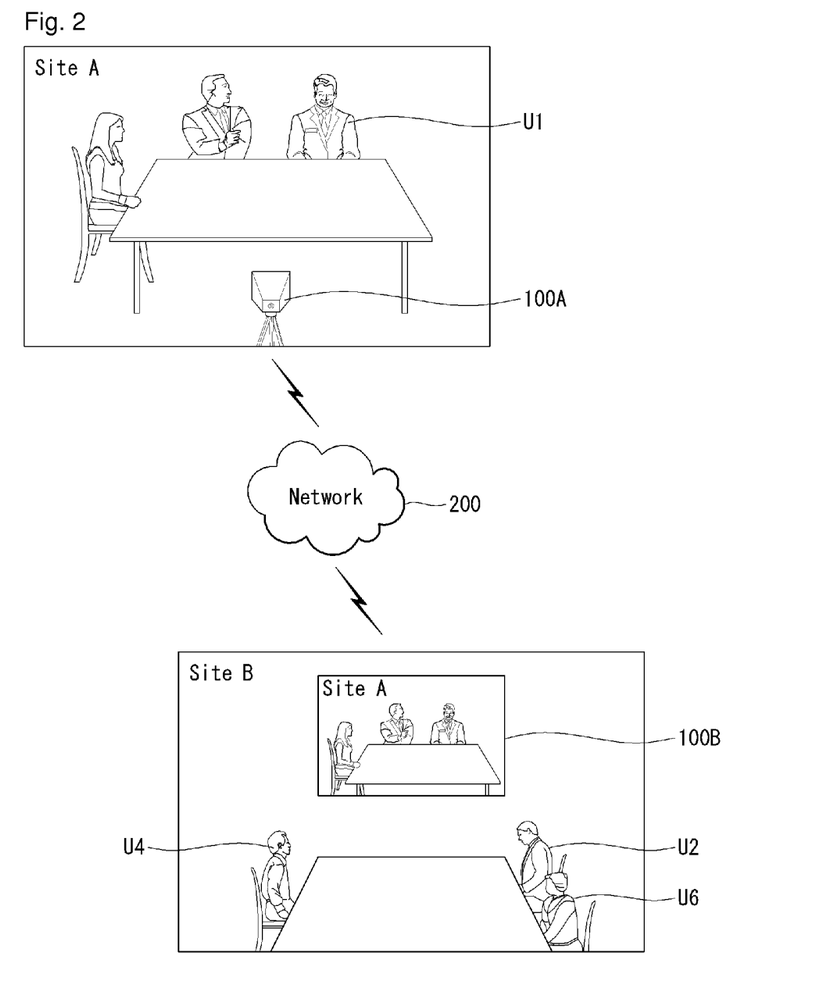
FIG. 2 is a view illustrating an environment according to an embodiment of the present invention.

An exemplary environment where the embodiments of the present invention apply is described with reference to FIG. 2. FIG. 2 is a view illustrating an environment according to an embodiment of the present invention.

Referring to FIG. 2, users in sites A and B have a remote video conference.

A voice and/or motion of a first user U1 at site A may be obtained and converted into video data and/or audio data by a first electronic device 100A positioned in site A.

The video data and/or audio data may be transmitted to a second electronic device 100B positioned in site B through a predetermined network 200. The second electronic device 100B may visually or audibly output the transmitted video data and/or audio data through its output unit.

The first electronic device 100A and the second electronic device 100B each may be implemented as the electronic device 100 described in connection with FIG. 1. However, according to an embodiment, the first electronic device 100A or the second electronic device 100B may include more or less components than the components included in the electronic device 100, and according to an embodiment, the first electronic device 100A may include different components from components of the second electronic device 100B.

FIG. 2 illustrates that the first electronic device 100A obtains and transmits the video data and/or audio data and the second electronic device 100B outputs the transmitted video data and/or audio data. According to an embodiment, the first electronic device 100A and the second electronic device 100B may be exchanged in light of the function and operation. Alternatively, each of the first electronic device 100A and the second electronic device 100B may include all of the functions described above.

For example, the first user U1 may transmit his image and/or voice to the second electronic device 100B through the first electronic device 100A while simultaneously receiving and outputting the second user U2's image and/or voice. The second user U2 may also perform the same or similar functions through the second electronic device 100B.

Further, the remote video conference can be implemented among a plurality of electronic devices as well.

Referring to FIGS. 3 to 11, methods of controlling an electronic device according to embodiments of the present invention are described, which may be implemented in the environment described above in connection with FIG. 2. The control methods may be performed by the electronic device 100 described in connection with FIG. 1.

For ease of description, the remote video conference is performed between the first electronic device 100A and the second electronic device 100B, and the description mainly focuses on the operation of the second electronic device 100B positioned in site B. However, the embodiments of the present invention are not limited thereto.

Figure 3:
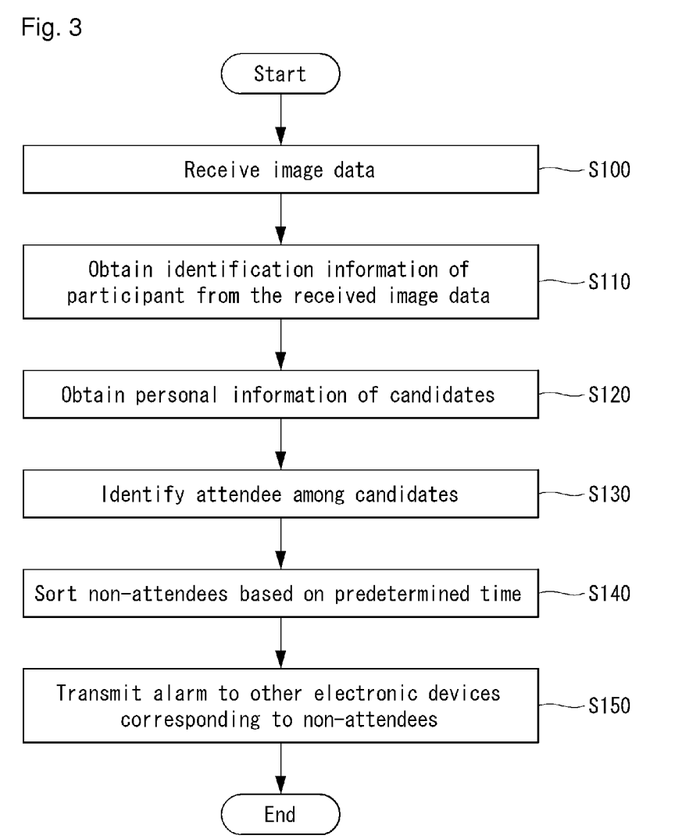
FIG. 3 is a flowchart illustrating a method of controlling an electronic device according to an embodiment of the present invention.

FIG. 3 is a flowchart illustrating a method of controlling an electronic device according to an embodiment of the present invention.

Referring to FIG. 3, the control method includes a step of receiving image data (S100), a step of obtaining information for identifying a participant from the received image data (S110, a step of obtaining personal information of conference attending candidates (also simply referred to as "candidates") (S120), a step of identifying an attendee among the attending candidates (S130), a step of sorting a non-attendees based on a predetermined time (S140), and a step of transmitting an alarm to another electronic device corresponding to the non-attendees (S150).

Hereinafter, each step is described in greater detail.

The communication unit 110 may receive image data (S100).

The image data may include a still image or movie received from an external electronic device, e.g., by streaming. The image data may be an image including at least one participant.

Figure 4:
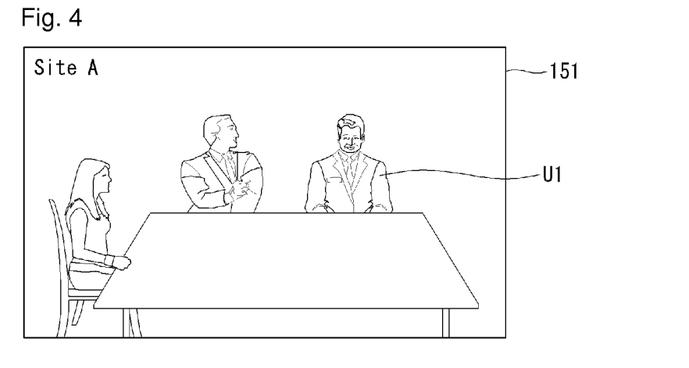
FIGS. 4 to 9 are views illustrating exemplary images displayed on a display unit for describing a method of controlling an electronic device according to embodiments of the present invention.

Referring to FIG. 4, the display unit 151 of the second electronic device 100B may display an image including a participant, e.g., the first user U1, attending the remote video conference at site A, the image being received from the first electronic device 100A. The image data may be a video reflecting an actual situation as obtained by the camera 121 of the first electronic device 100A, a synthesized video of the actual situation reflecting video and a virtual image, or a video image by substituting at least part of the actual situation reflecting video with another image.

Figure 5:
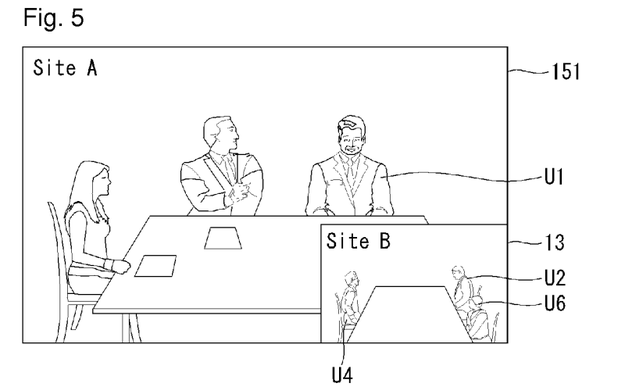

Referring to FIG. 5, the display unit 151 may display on a split screen portion 13 image data including the second user U2 positioned in site B, the image data being obtained by the camera 121, in addition to the image data of site A received from the first electronic device 100A.

The split screen portion 13 may be positioned at an upper/lower or right/left portion of the display unit 151. The size of the split screen portion 13 may vary with the number of the external electronic devices attending the remote video conference or may be set by a user. The controller 180 may obtain information for identifying the participant from the received image data (S120).

The participant is a person attending the remote video conference and may be the first user U1 positioned in site A or the second user U2 positioned in site B as shown in FIG. 5.

The identification information of the participant may include at least one of the participant's name, image, and contact information, and information on where the participant belongs.

The controller 180 may obtain the participant's identification information from the image data by various methods.

For example, the controller 180 may extract a virtual object image from a particular region included in the received image data based on featuring points of the image and ma obtain the participant's identification information from the virtual object image. The virtual object image may be a two-dimensional or three-dimensional image.

Figure 6:
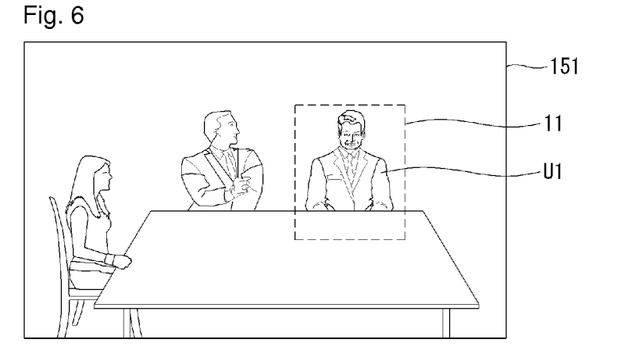

Referring to FIG. 6, the controller 180 may extract a virtual object image of the first user U1 that attends the remote video conference at site A from a particular region 11 included in the image data received from the first electronic device 100A.

Accordingly, the controller 180 may perform analysis by applying an image processing technology or face recognition technology to the extracted virtual object image to obtain the participant's identification information and may store the identification information in the memory 160. In addition to obtaining the identification information of the participant attending the remote video conference at site A using the image data received from the first electronic device 100A, the controller 180 may also obtain identification information of a participant attending the remote video conference at site B using image data of site B as obtained from the camera of the second electronic device 100B.

Figure 7:
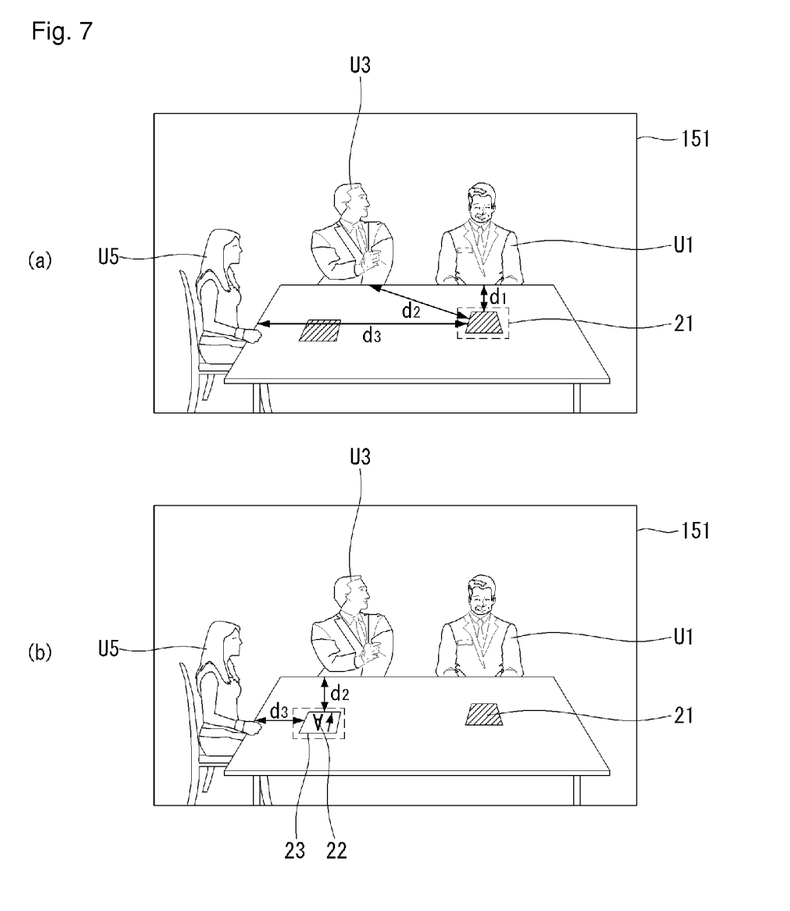
Figure 8:
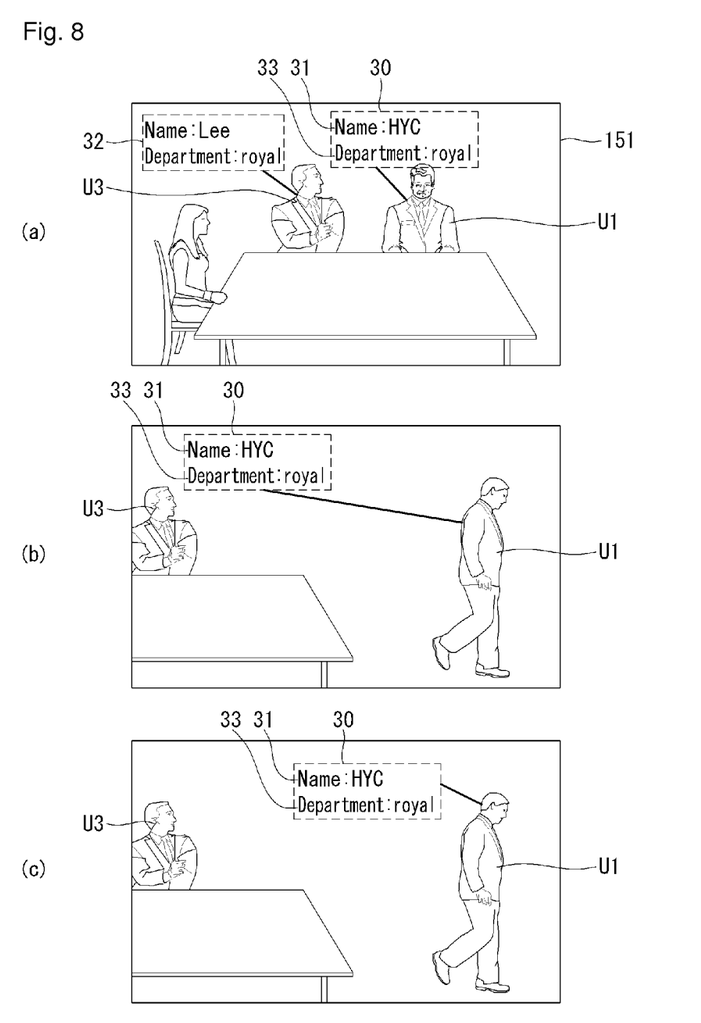
Figure 9:
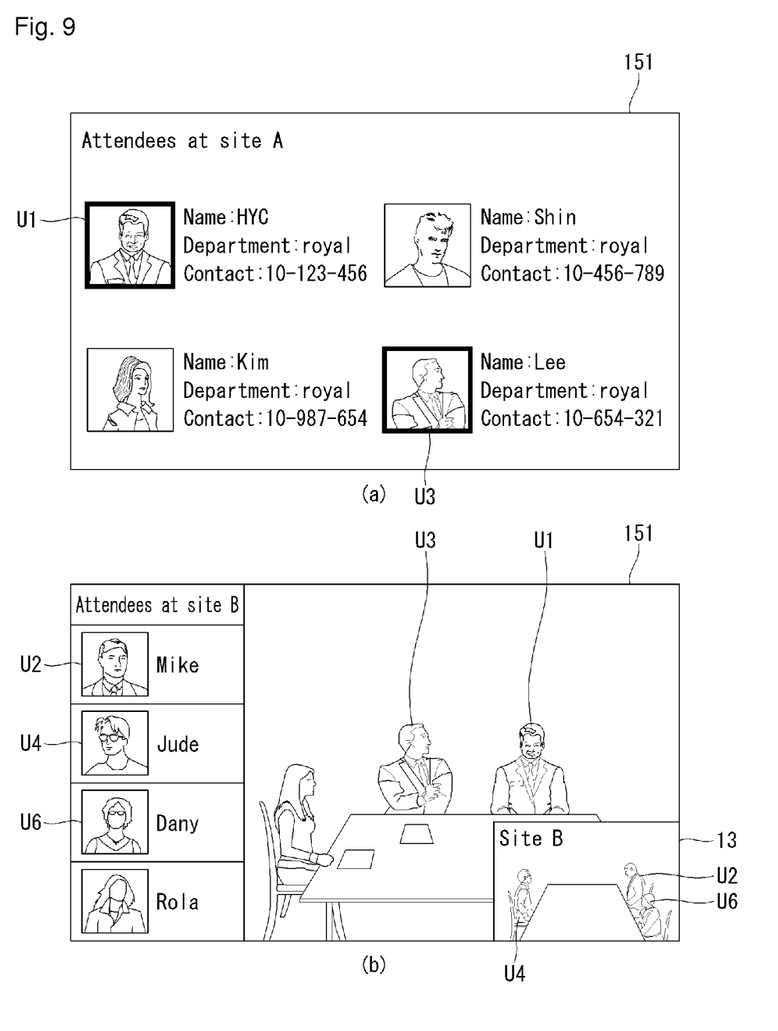
Figure 10:
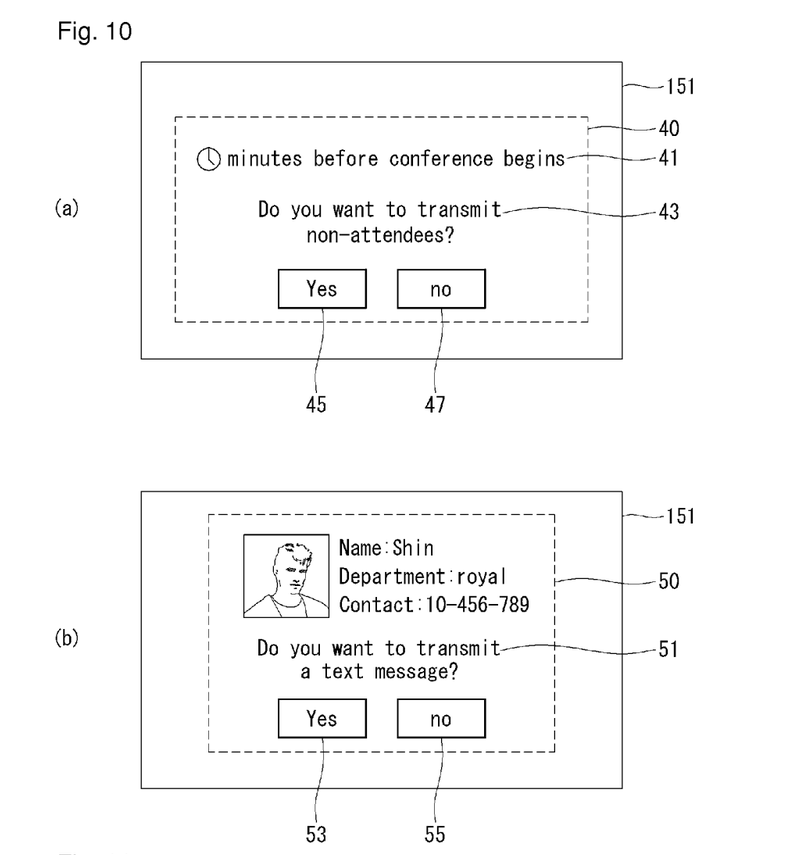
FIGS. 10 and 11 are views illustrating exemplary user interfaces displayed on a display unit for describing a method of controlling an electronic device according to embodiments of the present invention.

As shown in FIG. 7, the controller 180 may also obtain identification information of the participant attending the remote video conference at site A from particular identifiers 21 and 23 included in the image data received from the first electronic device 100A.

The particular identifiers 21 and 23 may include a business card, QR code, or color code that includes personal information of each participant of the remote video conference.

The controller 180 may obtain the participant's identification information by determining whether the particular identifiers 21 and 23 correspond to the participant.

Whether the particular identifiers 21 and 23 correspond to the participant may be determined depending on positional relationship, e.g., a direction or distance between the participant and the particular identifiers 21 and 23.

Referring to FIG. 7A, the first, third, and fifth users U1, U3, and U5 attending the remote video conference at site A may have particular identifiers 21 and 23.

For example, as shown in FIG. 7A, the controller 180 may compare a distance d1 between the particular identifier 21 and the first user U1, a distance d2 between the particular identifier 21 and the third user U3, and a distance d3 between the particular identifier 21 and the fifth user US. Since among the distances d1, d2, and d3, the distance d1 is the shortest, the controller 180 may determine that the particular identifier 21 corresponds to the first user U1.

As another example, as shown in FIG. 7B, when a distance d2 between the particular identifier 23 and the third user U3 is the same as a distance d3 between the particular identifier 23 and the fifth user U5, the controller 180 may determine a correspondence by recognizing a direction of the particular identifier 23. A reference for determining the sameness may be whether a difference in distance is within a predetermined value. In recognizing the direction, the correspondence may be determined depending on which direction enables the particular identifiers to be easily readable. Referring to FIG. 7B, since a character 'A' (22) included in the particular identifier 23 is placed in a direction to allow the third user U3 to more easily identify the character, the controller 180 may determine that the particular identifier 23 corresponds to the third user U3.

Alternatively, the controller 180 may determine whether the particular identifier 21 corresponds to the first user U1 by determining whether a distance between the particular identifier 21 and the first user U1 is a predetermined value or less. For example, when the distance between the particular identifier 21 and the first user U1 is the predetermined value or less, the controller 180 may determine that the particular identifier 21 corresponds to the first user U1.

When the particular identifier 21 corresponds to the first user U1, the controller 180 may obtain identification information of the first user U1 included in the particular identifier 21. Other than obtaining the identification information of the participant attending the remote video conference at site A from the image data received from the first electronic device 100A, the second electronic device 100B may also obtain identification information of the participant attending the remote video conference at site B from the image data obtained from the second electronic device 100B as indicated on a split screen 13 of FIG. 5. On the display unit 151 may be displayed in association with the participant's virtual object image the participant's identification information obtained from the particular identifiers 21 and 23 by the controller 180. The participant's virtual object image and the participant's identification information may be associated with each other by various methods.

For example, the participant's identification information may be displayed on a position that does not overlap the participant's virtual object image while matching the participant's virtual object image, and the associated state may be displayed as a straight or curved line.

Referring to FIG. 8A, identification information 30 of the first user U1 may be displayed at an upper end of the virtual object image of the first user U1. The identification information 30 may be personal information obtained by the controller 180 or information included in the particular identifier, such as the business card, QR code, or color code, and may be displayed together with the name of the first user U1, e.g., 'HYC 31', and where the first user U1 belongs, e.g., 'Royal 33.'

As shown in FIG. 8B, when the first user U1 moves, the identification information 30 of the first user U1 changes the length or position of the connected straight or curved line while matching or remaining associated with the virtual object image of the first user U1, so that the virtual object image and the identification may be displayed while associated with each other. Or, as shown in FIG. 8C, as the first user U1 is on the move, the identification information 30 may be relocated in real time while matching or being associated with the virtual object image of the first user U1. The controller 180 may obtain personal information of a conference attending candidate (hereinafter, also simply referred to as "candidate") (S120).

The candidate may be determined by a user making an email relating to the conference for a particular person associated with site A or site B.

The personal information of the candidate may include at least one of the candidate's name, image, contact information, or where he belongs. The contact information may include a mobile phone number or an email address.

The controller 180 may obtain personal information of a conference attending candidate at site A and/or site B by various methods.

For example, the controller 180 may obtain personal information of a candidate at B, such as his name, image, or contact information or where he belongs, from an external server based on a list of conference attending candidates at site B.

As another example, the controller 180 may obtain from the memory 160 the personal information of the candidate at site B, which is pre-stored in the memory 160.

The first electronic device 100A may obtain the personal information of a conference attending candidate at site A, in the same method as the method by which the second electronic device 100B obtains the personal information of a conference attending candidate at site B.

Accordingly, the second electronic device 100B may receive the personal information of the candidate at site A from the first electronic device 100A through the communication unit 110.

The controller 180 may identify an attendee among conference attending candidates based on the participant's identification information and the candidates' personal information (S130). As described above, the controller 180 may obtain the participant's identification information from the object image or from the particular identifiers, and may obtain the candidates' personal information from the external server or the memory 160 or from the first electronic device 100A.

The controller 180 may identify the attendee among the candidates by determining whether the participant's identification information corresponds to the candidates' personal information.

For example, the controller 180 may analyze the virtual object image extracted from the image data received from the first electronic device 100A by an image processing technology or face recognition technology to determine whether to correspond to the image included in the personal information of the candidate at site A.

When determining that the virtual object image corresponds to any one of images of the candidates at site A, the controller 180 may identify the determined participant as the attendee.

The personal information of the candidate may include only the face recognition information other than the candidate's image. Accordingly, the controller 180 may identify the attendee by determining whether the face recognition information of the virtual object image corresponds to the face recognition information included in the candidate's personal information.

For example, when it is determined that the identification information of the first user U1 at site A as obtained from the particular identifier corresponds to the personal information of the candidate at site A, the controller 180 may identify the first user U1 at site as the attendee.

When determining that the identification information of the participant at site B corresponds to the personal information of the candidate at site B, the second electronic device 100B may identify the participant at site B as the attendee.

The first user U1 at site A and the second user U2 at site B are not always the candidates for the remote video reference. For example, the identification information of the first user U1 at site A and the second user U2 at site B may not correspond to the personal information of the candidates at site A or B.

The second electronic device 100B determines whether both the identification information of the participant as obtained from the virtual object image and the identification information of the participant as obtained from the particular identifier correspond to the personal information of the candidate, and only when both identification information correspond to the candidate's personal information, may identify the participant as the attendee.

The controller 180 may sort non-attendees except for the identified attendees among the candidates based on a predetermined time (S140).

When the predetermined time arrives or passes with respect to a conference start time of the remote video conference, among the candidates site A or B, the controller 180 may determine the other candidates than the attendee identified in step S130 as the non-attendees.

The controller 180 may display a list of the attendees at site A or B and a list of the non-attendees and may display the attendees and non-attendees in a distinguishable manner.

For example, referring to FIG. 9A, the controller 180 may provide information on attendance at site A based on the predetermined time, e.g., by displaying the outer circumferences of the images of the first and third users U1 and U3 at site A in a different color or in a highlighted manner.

The second electronic device 100B may receive the information of the attendees at site A as sorted by the first electronic device 100A through the communication unit 110 from the first electronic device 100A and may display the received information through the display unit 151.

For example, referring to FIG. 9B, the controller 180 may provide information of attendees at site B based on the predetermined time, e.g., by displaying the outer circumferences of the images of the second, fourth, and sixth users U2, U4, and U6 as identified as attendees at site B in a different color or in a highlighted manner.

Other than displaying in a different color or highlighting, various other ways may be used to distinguish the non-attendees from the attendees.

As such, the controller 180 may identify the attendees based on the predetermined time and may sort the attendees in a distinguishable manner from the non-attendees. The controller 180 may transmit an alarm to the second electronic devices corresponding to the non-attendees sorted in step S140 (S150).

When the predetermined time arrives or passes, the controller 180 may transmit an alarm including information on the remote video conference to the non-attendees.

The alarm may include information on at least one of the conference attending candidate, conference time, conference site, and conference topic. The second electronic devices corresponding to the non-attendees may include smart phones, mobile phones, PDAs (Personal Digital Assistants), PMPs (Portable Multimedia Players), MIDs (Mobile Internet Devices), tablet PCs, laptop computers, personal computers, or any other electronic devices that may communicate with the first or second electronic device 100A or 100B.

The controller 180 may transmit the alarm based on the contact information corresponding to the non-attendees.

The transmittance of the alarm may be performed in various ways. For example, the controller 180 may transmit the alarm by texting or emailing.

The non-attendees may receive the alarm through an electronic device, such as a smart phone, mobile phone, PDA, PMP, MID, tablet PC, laptop computer, or personal computer.

When the predetermined time arrives or passes, the controller 180 may automatically transmit the alarm or may provide a user interface 40, 50, or 60 so that a user may select whether to transmit the alarm.

For example, when a setting 41 "20 minutes before conference begins" is done as shown in FIG. 10A, the controller 180 may provide a user interface 40 including a message 43 saying "do you want to transmit an alarm message to non-attendees?" to inquire whether to transmit the alarm message to the non-attendees sorted in step S140 20 minutes before the conference begins. Accordingly, a user may select 'yes' 45 or 'no' 47 to determine whether to transmit the alarm message.

Referring to FIG. 10B, when the user selects 'yes' 45, the controller 180 may provide a user interface 50 including a message 51 saying "do you want to transmit a text message?" inquiring whether to transmit the text message to the non-attendees among the candidates. Accordingly, the user may select 'yes' 53 or 'no' 55 to select whether to transmit the text message. When selecting 'no' 55, the controller 180 may provide another user interface including a message inquiring whether to transmit an email.

Figure 11:
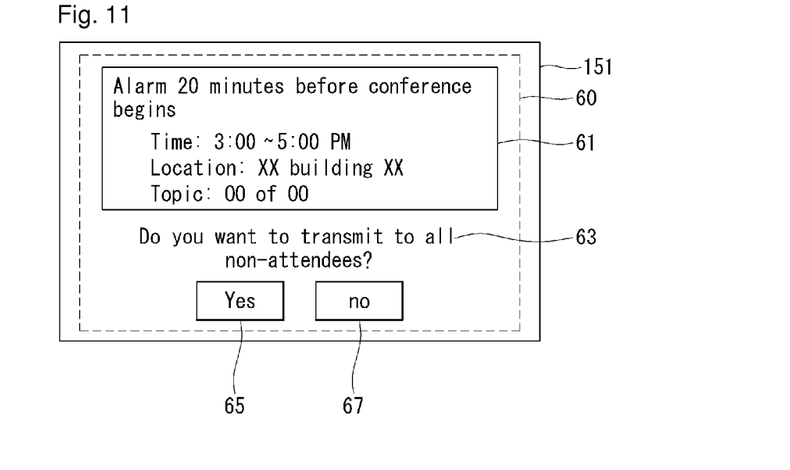

Referring to FIG. 11, a user interface 60 may be provided to inquire whether to transmit an alarm including the conference relating information to all the non-attendees sorted in step S140 based on the predetermined time.

When a setting is done as "20 minutes before conference begins", the user interface 60 may be provided that include an alarm message 61 including the conference relating information including conference time, site, and topic, and a message saying "do you want to transmit to all attendees?". The user may select 'yes' 65 or 'choose' 67, and when selecting 'choose' 67, may transmit only some of the non-attendees.

According to an embodiment, the controller 180 may provide a user interface that allows a user to select at least one of texting or emailing.

Other than obtaining the participant's identification information from the received image data, the controller 180 may obtain the participant's identification information from an RFID tag including the participant's identification information. For example, the first electronic device 100A may obtain the participant's identification information from the RFID tag of participants attending the remote video conference at site A. Accordingly, the second electronic device 100B may receive through the communication unit 110 the participant's identification information obtained by the first electronic device 100A. When obtaining the participant's identification information through the RFID tag, the second electronic device 100B may directly receive through the communication unit the information of the attendee at site A as identified by the first electronic device 100A. Accordingly, the second electronic device 100B may sort the non-attendees based on the attendee's information received through the communication unit 100 and may transmit an alarm to other electronic devices corresponding to the non-attendees.

Thus, when all the candidates are identified as the attendees or a sufficient number of attendees are identified to proceed with the conference, the controller 180 may enable the remote video conference to commence.

According to the embodiments of the present invention, it can be possible to receive in real time the attendees' information to identify whether there are any attendees to be able to perform a remote video conference between remote sites.

Further, an alarm may be transmitted to the non-attendees other than the attendees among the conference attending candidates based on a predetermined time so that a remote video conference can be done smoothly even without having any waiting time or connecting to the video conference system to identify whether there are any attendees.

In the methods of operating an electronic device according to the embodiments, each step is not necessary and according to an embodiment, the steps may be selectively included therein. The steps are not necessary to perform in the order described above, and according to an embodiment, a later step may be performed earlier than an earlier step.

The methods of operating an electronic device may be stored in a computer readable medium in the form of codes or a program for performing the methods.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. An electronic device comprising:
a memory;
a communication unit configured to receive image data; and
a controller configured to:
cause storing of personal information of a plurality of candidates in the memory;
obtain identification information of a participant based on a specific identifier included in the received image data;
determine that the specific identifier corresponds to the participant based on a positional relationship and a directional relationship between the participant and the specific identifier, wherein the positional relationship comprises a first distance between the participant and the specific identifier;
determine the participant included in the plurality of candidates and having the identification information that matches at least one of the personal information stored in the memory as an attendee;
determine a candidate other than the determined attendee among the plurality of candidates as a non-attendee when the candidate corresponding to the non-attendee is not identified in the received image data at a predetermined time; and
cause transmission of an alarm to at least one other electronic device corresponding to the determined non-attendee.

2. The electronic device of claim 1,
wherein the personal information includes at least one of names, images, departments, or contact information of the plurality of candidates, and
wherein the controller is further configured to cause the transmission of the alarm based on contact information corresponding to the non-attendee.

3. The electronic device of claim 2,
wherein the identification information of the participant is obtained based on a virtual object image extracted from a specific region included in the image data, and
wherein the controller is further configured to:
determine whether the virtual object image corresponds to an image included in the personal information; and
determine the attendee based on the correspondence between the virtual object image and the image included in the personal information.

4. The electronic device of claim 1, wherein the alarm includes information on at least one of the plurality of candidates, a conference time, a conference site, or a conference topic.

5. The electronic device of claim 1, further comprising a display unit, wherein the controller is further configured to cause the display unit to display information associated with the determined attendee in addition to the image data.

6. The electronic device of claim 1, wherein the controller is further configured to determine that the specific identifier corresponds to the participant based on the directional relationship between the participant and the specific identifier when the first distance is same as a second distance between another participant among the plurality of participants and the specific identifier or when a difference between the first distance and the second distance is within a predetermined range of values.

7. The electronic device of claim 6, wherein the controller is further configured to determine that the specific identifier corresponds to the participant by recognizing a specific direction of the specific identifier with respect to the participant while the specific identifier is not positioned in the specific direction with respect to the another participant.

8. The electronic device of claim 1, wherein the specific identifier comprises a business card, QR code, or color code that includes the corresponding personal information.

9. The electronic device of claim 1, wherein the predetermined time is a start time of a remote video conference or a specific time prior to the start time of the remote video conference, the specific time preceding the start time by a preset period of time.

10. A method for controlling an electronic device, the method comprising:
receiving image data;
storing personal information of a plurality of candidates in a memory;
obtaining identification information of a participant based on a specific identifier included in the received image data;
determining that the specific identifier corresponds to the participant based on a positional relationship and a directional relationship between the participant and the specific identifier, wherein the positional relationship comprises a first distance between the participant and the specific identifier;
determining the participant included in the plurality of candidates and having the identification information that matches at least one of the personal information stored in the memory as an attendee;
determining a candidate other than the determined attendee among the plurality of candidates as a non-attendee when the candidate corresponding to the non-attendee is not identified in the received image data at a predetermined time; and
transmitting an alarm to at least one other electronic device corresponding to the determined non-attendee.

11. The method of claim 10,
wherein the personal information includes at least one of names, images, departments, or contact information of the plurality of candidates, and
wherein the alarm is transmitted based on contact information corresponding to the non-attendee.

12. The method of claim 11, wherein the identification information of the participant is obtained based on a virtual object image extracted from a specific region included in the image data, and the method further comprises:
determining whether the virtual object image corresponds to an image included in the personal information; and
determining the attendee based on the correspondence between the virtual object image and the image included in the personal information.

13. The method of claim 10, wherein the alarm includes information on at least one of the plurality of candidates, a conference time, a conference site, or a conference topic.

14. The method of claim 10, further comprising displaying information associated with the determined attendee on a display in addition to the image data.

* * * * *